(12) United States Patent
Hasegawa et al.

(10) Patent No.: US 12,199,413 B2
(45) Date of Patent: Jan. 14, 2025

(54) GAS INSULATION APPARATUS

(71) Applicants: KABUSHIKI KAISHA TOSHIBA, Tokyo (JP); Toshiba Energy Systems & Solutions Corporation, Kawasaki (JP)

(72) Inventors: Tomohiro Hasegawa, Kanagawa (JP); Tooru Inoue, Kanagawa (JP); Norimitsu Kato, Kanagawa (JP); Amane Majima, Kanagawa (JP); Toshiyuki Uchii, Kanagawa (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 389 days.

(21) Appl. No.: 17/650,305

(22) Filed: Feb. 8, 2022

(65) Prior Publication Data
US 2022/0166198 A1 May 26, 2022

Related U.S. Application Data

(63) Continuation of application No. PCT/JP2019/045779, filed on Nov. 22, 2019.

(51) Int. Cl.
  *H02B 13/055* (2006.01)
(52) U.S. Cl.
  CPC .................. *H02B 13/055* (2013.01)
(58) Field of Classification Search
  CPC .................................................. H02B 13/055
  See application file for complete search history.

(56) References Cited

U.S. PATENT DOCUMENTS

| | | | |
|---|---|---|---|
| 5,417,950 A | 5/1995 | Sheu et al. | |
| 5,810,910 A * | 9/1998 | Ludwig | B01J 20/186 95/902 |
| 8,674,253 B2 * | 3/2014 | Uchii | H01H 33/905 218/63 |
| 2007/0221626 A1 | 9/2007 | Uchii | |
| 2021/0175030 A1 | 6/2021 | Iijima et al. | |

FOREIGN PATENT DOCUMENTS

| | | |
|---|---|---|
| CN | 102460870 A | 5/2012 |
| EP | 2 445 068 A1 | 4/2012 |
| EP | 3 069 421 | 9/2016 |
| JP | 2002-114504 A | 4/2002 |
| JP | 2007-258137 A | 10/2007 |
| JP | 2011-4494 A | 1/2011 |
| JP | 4660407 B2 | 3/2011 |
| JP | 5238622 B2 | 7/2013 |
| JP | 2014-146515 A | 8/2014 |
| JP | 2015-76408 A | 4/2015 |
| WO | WO 2014/187940 A1 | 11/2014 |
| WO | WO 2015/071303 A1 | 5/2015 |
| WO | WO 2019/106840 A1 | 6/2019 |

* cited by examiner

*Primary Examiner* — Sharon Pregler
(74) *Attorney, Agent, or Firm* — Finnegan, Henderson, Farabow, Garrett & Dunner, LLP

(57) ABSTRACT

A gas insulation apparatus has a sealed container, an insulation gas, a high-voltage portion, and a removal material. The insulation gas has $CO_2$ and $O_2$ filling the sealed container as main components. The high-voltage portion is stored in the sealed container. The removal material reduces concentrations of HF, CO, and $O_3$ in the insulation gas.

8 Claims, 3 Drawing Sheets

GAS INSULATION APPARATUS

CROSS-REFERENCE TO RELATED APPLICATION

This application is a Continuation of International Application No. PCT/JP2019/045779, filed Nov. 22, 2019, the entire contents of which are incorporated herein by reference.

TECHNICAL FIELD

An embodiment of the present invention relates to a gas insulation apparatus.

BACKGROUND ART

In a gas insulation apparatus performing power transmission and distribution in an electric power system, in the related art, sulfur hexafluoride (which will hereinafter be described as $SF_6$) is used an insulation gas.

Since $SF_6$ has a global warming potential (GWP) of 23,500 (AR5; the latest value according to the IPCC fifth assessment report) and significantly affects the environment at the time of leakage, alternative gas insulation apparatuses using carbon dioxide (which will hereinafter be described as $CO_2$), which has a lower environmental burden, as an insulation gas are attracting attention. When $CO_2$ is used as an insulation gas, it is known that an effect of improving a breaking performance and a dielectric strength can be achieved by mixing oxygen (which will hereinafter be described as $O_2$) therewith.

When an insulation gas sealed inside a gas insulation apparatus is exposed to an arc during opening/closing operation, decomposition products are generated. These decomposition products include undesired substances which adversely affect the performance of equipment, and thus there is a need to provide countermeasures for removing them from the insulation gas, such as adsorption using an adsorbent or the like. In addition, during maintenance, there is also a need to secure safety of decomposition products with respect to the human body. Regarding decomposition products, for example, a value of LC 50 or the like is set for each of CO, HF, and $O_3$, and they become noxious with respect to the human body at a concentration of a certain value or larger. Therefore, there is a need to reduce these.

A usage environment of an adsorbent when the adsorbent is installed in a gas insulation apparatus is mainly in a standstill state at a normal temperature, so that an insulation gas comes into contact with the adsorbent due to a convection flow, thereby resulting in adsorption. For this reason, active inflow of a target gas cannot be expected. Such an adsorbent is required to sufficiently adsorb decomposition products as necessary in a special usage environment as well.

Undesired substances such as $SOF_2$, HF, and $SO_2$ have become particularly problematic among decomposition products in insulation equipment using a $SF_6$ gas in the related art. $SOF_2$ is derived from $SF_6$ and a very small amount of $H_2O$ included in the gas. HF is derived from $SOF_2$, PTFE of equipment constituent components, and a very small amount of $H_2O$ included in the gas. $SO_2$ is derived from $SOF_2$ and a very small amount of $H_2O$ included in the gas.

The foregoing undesired substances have a smaller molecular size than $SF_6$ (insulation gas). Therefore, by selecting an adsorbent such that a relationship of SF6>pore size of adsorbent>undesired substances is established, the undesired substances can be preferentially adsorbed by physical adsorption utilizing molecular sieve action.

On the other hand, the main undesired substances in a gas insulation apparatus using a $CO_2$ gas are HF, CO, and $O_3$. HF is derived from a very small amount of $H_2O$ included in the gas and PTFE of equipment constituent components. Particularly, when $O_2$ is mixed with $CO_2$ as an insulation gas, generation of CO is curbed to an extent that it can be adsorbed. On the other hand, generation of $O_3$ tends to increase. The molecular size of molecules of $CO_2$ is approximately 0.33 nm, which is smaller than 0.550 nm of $SF_6$, and is a molecular size which is approximately the same as those of undesired substances (HF, CO, and $O_3$). Therefore, in physical adsorption utilizing molecular sieve action by means of the pore size of an adsorbent, $CO_2$ (insulation gas) is adsorbed, and thus the foregoing undesired substances cannot be sufficiently adsorbed.

HF is bonded to a very small amount of $H_2O$ included in the gas, reacts with metal materials (Fe, Al), causes corrosion, and is poisonous to the human body when it is released to the atmosphere. In addition, CO is poisonous to the human body when it is released to the atmosphere. In addition, if a large amount of CO is generated (vol % order), there is concern that the dielectric strength may be degraded. Moreover, there is concern that $O_3$ may extremely impair a life span of a lubricant and a seal material (resin) due to ozone cracking, and it is poisonous to the human body when it is released to the atmosphere.

CITATION LIST

Patent Literature

[Patent Literature 1]
  Japanese Patent No. 4660407
[Patent Literature 2]
  Japanese Patent No. 5238622

SUMMARY OF INVENTION

Technical Problem

In order to resolve the problems, the present invention provides a gas insulation apparatus in which concentrations of HF, CO, and $O_3$ in an insulation gas are reduced.

Solution to Problem

A gas insulation apparatus according to an embodiment has a sealed container, an insulation gas, a high-voltage portion, and a removal material.

The insulation gas has $CO_2$ and $O_2$ filling the sealed container as main components.

The high-voltage portion is stored in the sealed container.

The removal material reduces concentrations of HF, CO, and $O_3$ in the insulation gas.

DESCRIPTION OF EMBODIMENT

Hereinafter, a gas insulation apparatus according to an embodiment will be described with reference to the drawings.

In order to resolve the foregoing problems, various research and tests have been performed. Consequently, it has been confirmed that a concentration of HF, CO, or $O_3$ in an insulation gas can be sufficiently reduced and a life span and reliability of a gas insulation apparatus using an insulation gas having $CO_2$ and $O_2$ as main components can be secured in long-term use by using a removal material constituted of an adsorbent or a catalyst manifesting selective adsorption action depending on a polarity and catalytic action. The present invention is based on this knowledge.

First Embodiment

Figure 1:
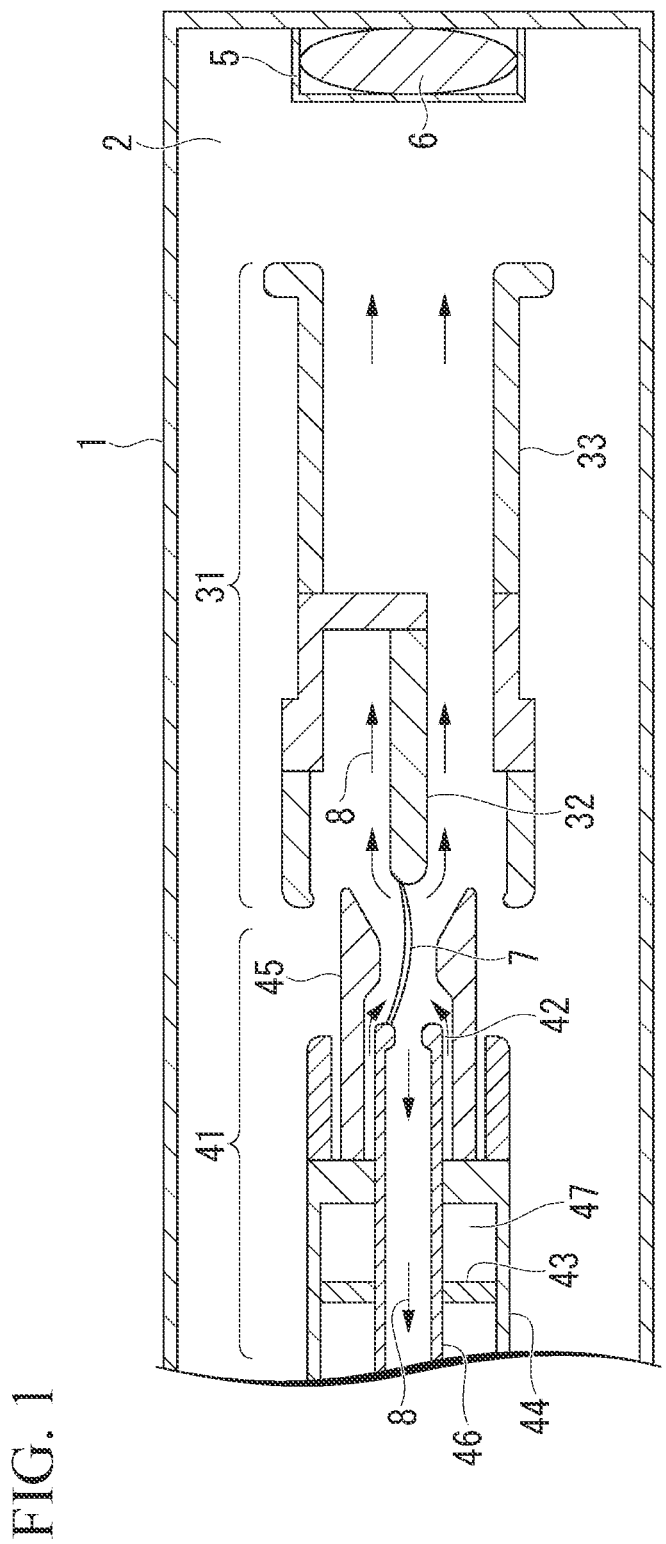
FIG. 1 is a schematic view illustrating a cross section of a gas insulation breaker according to a first embodiment.
Figure 2:
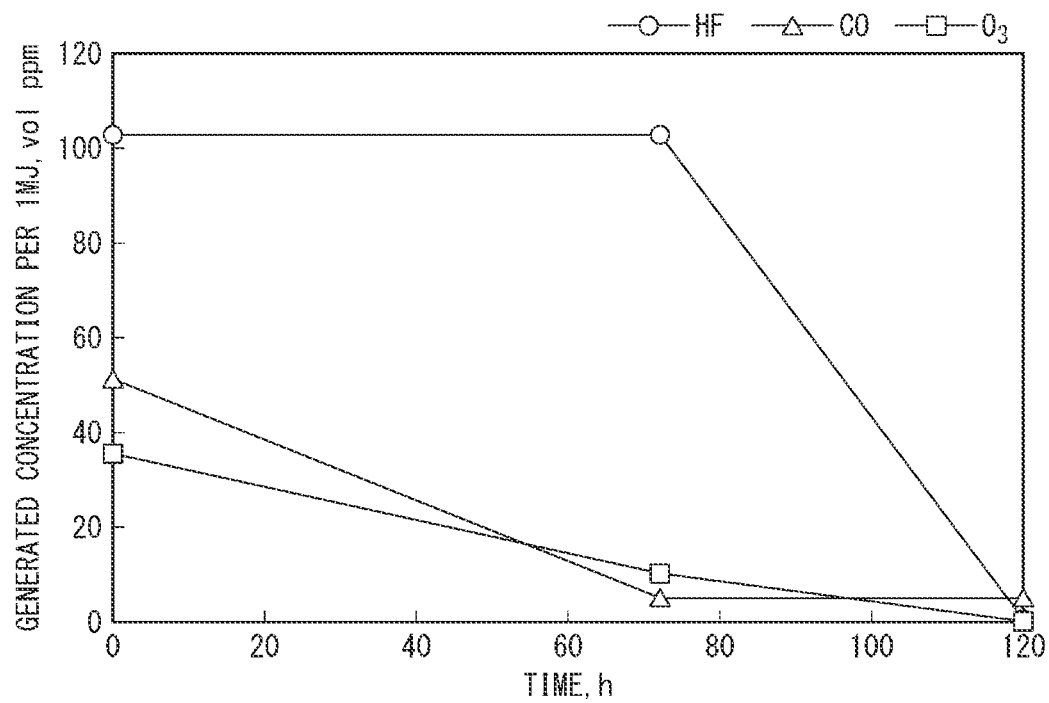
FIG. 2 is a graph showing a removal performance with respect to HF, CO, and $O_3$ of a removal material 1.
Figure 3:
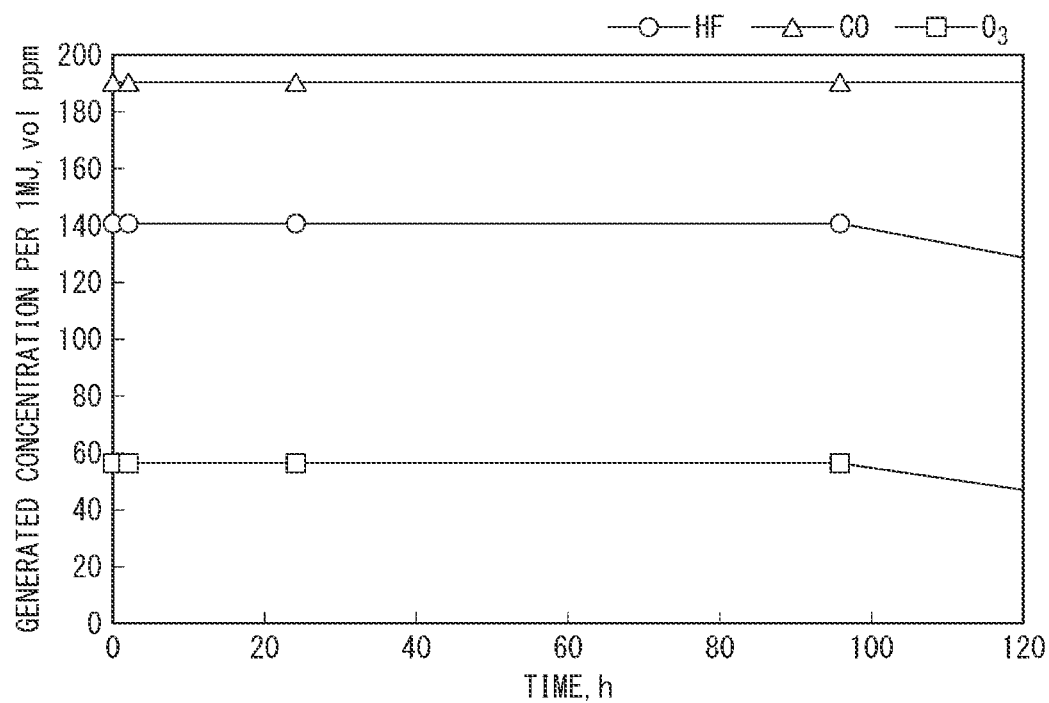
FIG. 3 is a graph showing a removal performance with respect to HF, CO, and $O_3$ of a removal material 2.
Figure 4:
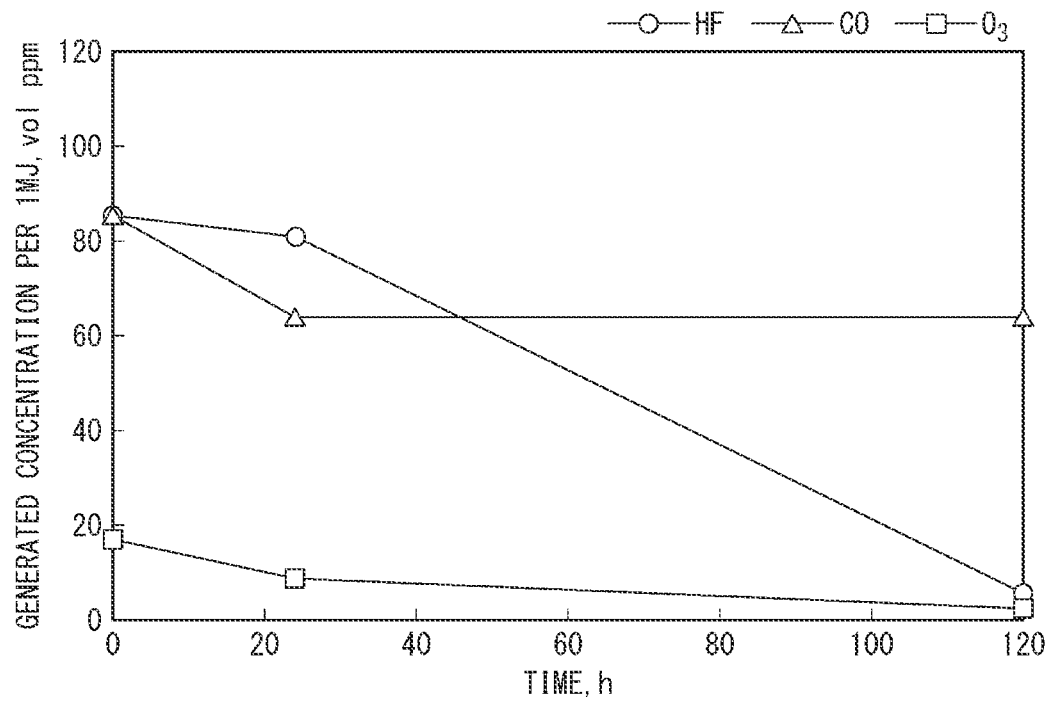
FIG. 4 is a graph showing a removal performance with respect to HF, CO, and $O_3$ of a removal material 3.
Figure 5:
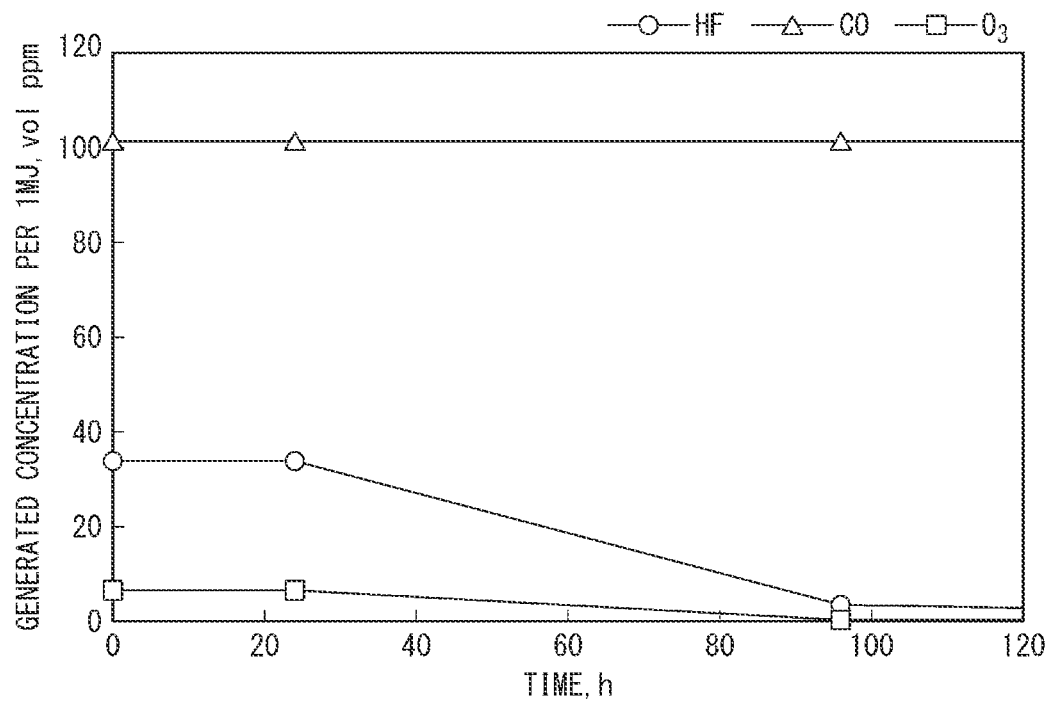
FIG. 5 is a graph showing a removal performance with respect to HF, CO, and $O_3$ of a removal material 4.

A first embodiment will be described using FIG. 1. A gas insulation apparatus according to the present embodiment is a puffer-type gas insulation breaker. FIG. 1 is a partial schematic cross-sectional view of the gas insulation apparatus (gas insulation breaker) according to the present embodiment.

As illustrated in FIG. 1, an insulation gas 2 fills the inside of a sealed container 1 constituted of a ground metal, a porcelain tube, or the like. Inside the sealed container 1, a fixed contact portion 31 and a movable contact portion 41 are disposed so as to face each other, and a fixed arc contactor 32 and a movable arc contactor 42 are respectively provided in the fixed contact portion 31 and the movable contact portion 41. A high-voltage portion is constituted of the fixed contact portion 31 and the movable contact portion 41. An O-ring or the like is disposed at a sealing location of the sealed container 1, thereby forming an airtight structure.

The arc contactors 32 and 42 are in a contact conduction state during normal operation, and they separate from each other and generate an arc 7 in a space between both the contactors 32 and 42 due to relative movement during breaking operation. Moreover, a gas flow generation means for spraying the insulation gas 2 (arc-extinguishing gas) to the arc 7 is installed on the movable contact portion 41 side.

Here, as the gas flow generation means, a piston 43, a cylinder 44, and an insulation nozzle 45 are provided. In addition, a metal exhaust cylinder 33 through which a hot gas flow 8 can pass is attached to the fixed contact portion 31 side. An exhaust rod 46 through which the hot gas flow 8 can pass is provided on the movable contact portion 41 side so as to lead to the movable arc contactor 42. A grease for reducing friction is applied to sliding portions of the piston 43 and the cylinder 44.

Regarding an insulation gas which fills the inside of the sealed container 1 and also functions as an arc-extinguishing gas, a gas having $CO_2$ and $O_2$ as main components is used. 50% or more by volume % of $CO_2$ is included, and $O_2$ is included within a range not exceeding 50% by volume %. Specifically, a mixed gas of $CO_2$ (70%) and $O_2$ (30%) can be presented as an example.

In addition, even when a gas having a larger molecular size than $CO_2$ is mixed into the insulation gas for the purpose of improving a dielectric strength, the effects of the present embodiment can be achieved. Examples of the mixed gas include compounds containing fluorine and iodine, such as hydrofluoromonoether, perfluoroketone, hydrofluoroolefin, perfluoronitrile, or trifluoroiodomethane.

Inside the sealed container 1, a removal material 6 having a function of reducing the concentrations of HF, CO, and $O_3$ in the insulation gas is installed. The removal material 6 is held inside the sealed container 1 by a case 5. An effect of more actively reducing the concentrations of HF, CO, and $O_3$ can be achieved by disposing the removal material 6 on a flow channel of the arc-extinguishing gas on an exit side of the exhaust cylinder 33.

The removal material 6 reduces the concentrations of HF, CO, and $O_3$ in the insulation gas by adsorbing, oxidizing, or reducing these substances. For example, regarding the removal material 6, a synthetic zeolite in which a mole ratio of silica/alumina is 5 or higher (which may hereinafter be referred to as a high silica synthetic zeolite), a synthetic zeolite having protons (H) as positive ions (which may hereinafter be referred to as a proton exchange synthetic zeolite), and a metal oxide can be presented as examples. In addition, the removal material 6 may be a combination of two or more kinds of a high silica synthetic zeolite, a proton exchange synthetic zeolite, and a metal oxide.

Moreover, the removal material 6 may be a combination of materials other than a high silica synthetic zeolite, a proton exchange synthetic zeolite, and a metal oxide. For example, a mixture of a material having a removal performance with respect to HF, a material having a removal performance with respect to CO, and a material having a removal performance with respect to $O_3$ may be used as the removal material 6 according to the present embodiment.

Regarding a high silica synthetic zeolite, for example, a high silica zeolite having a pore size of 4.9 Å and having protons as positive ions can be presented as an example. In addition, regarding a proton exchange synthetic zeolite, for example, a zeolite having a pore size of 4.9 Å can be presented as an example. Moreover, regarding a metal oxide, $CuO$, $CO_3O_4$, and $MnO_2$ can be presented as examples.

Regarding a zeolite, generally, it is known that the strength and reaction activity as a solid acid increase as the mole ratio of alumina ($Al_2O_3$) to silica ($SiO_2$) becomes high. When a high silica zeolite having a silica/alumina ratio is 5 or higher is used as the removal material 6, the removal material 6 manifests catalytic action of oxidizing CO into $CO_2$ as a solid acid. In addition, the speed of $O_3$ changing to $O_2$ due to self-reaction is accelerated. HF is physically adsorbed into the pores due to an intermolecular force (Van der Waals force) generated depending on the polarity of the zeolite. Accordingly, due to the high silica synthetic zeolite, three kinds of undesired substances, such as HF, CO, and $O_3$, can be effectively adsorbed, oxidized, and reduced.

In addition, when protons ($H^+$) are adopted as positive ions of the synthetic zeolite, it can be used as a solid acid and manifests catalytic action of oxidizing CO into $CO_2$. In addition, the speed of $O_3$ changing to $O_2$ due to self-reaction is accelerated. HF is physically adsorbed into the pores due to an intermolecular force (Van der Waals force) generated depending on the polarity of the zeolite. Accordingly, due to the proton exchange synthetic zeolite, three kinds of undesired substances, such as HF, CO, and $O_3$, can be effectively adsorbed, oxidized, and reduced.

Moreover, metal oxides such as $CuO$, $CO_3O_4$, and $MnO_2$ have a function of a catalyst at least within a temperature range of −30° C. to 50° C. Since these metal oxides are oxidation catalysts, they manifest catalytic action of oxidizing CO into $CO_2$. In addition, the speed of $O_3$ changing to $O_2$ due to self-reaction is accelerated. HF is physically adsorbed on a surface of the catalyst due to an intermolecular force (Van der Waals force) generated depending on the polarity. Accordingly, due to the metal oxide, three kinds of undesired substances, such as HF, CO, and $O_3$, can be effectively adsorbed, oxidized, and reduced.

A metal oxide may be added to a coating material such that an inner surface of the sealed container 1 is coated therewith, and thus the inner surface of the sealed container 1 can have a function of a catalyst.

In a breaking process of the gas insulation breaker having the foregoing constitution, when the movable contact portion 41 operates in the leftward direction in FIG. 1, the fixed piston 43 compresses a puffer chamber 47 that is an internal space of the cylinder 44 and raises the pressure therein. Further, the insulation gas 2 present inside the puffer chamber 47 becomes a high-pressure gas flow, is guided to the insulation nozzle 45, and is strongly sprayed to the arc 7 generated between the arc contactors 32 and 42. Accordingly, the conductive arc 7 generated between the arc contactors 32 and 42 disappears and a current is blocked.

When $O_2$ is mixed into a gas including $CO_2$ and an arc is ignited, there is a likelihood that HF, CO, and $O_3$ are generated. HF is a gas having corrosiveness particularly with respect to a metal and is noxious with respect to the human body. CO is a toxic gas and degrades the dielectric strength of the insulation gas. $O_3$ is also a gas having high reactivity and being poisonous to the human body. In addition, $O_3$ causes the O-ring used for the sealed container 1 retaining the airtight structure or grease applied to the sliding portions of the piston 43 and the cylinder 44 to deteriorate. When the removal material 6 having a function of reducing the concentrations of HF, CO, and $O_3$ in the insulation gas is installed inside the sealed container 1, these poisonous gases can be adsorbed, oxidized, or reduced, safety can be enhanced, and the life span of the equipment can be lengthened.

Table 1 shows performances of various kinds of removal materials. A removal material 1 is a proton exchange synthetic zeolite in which the mole ratio of silica/alumina is 5 and the pore size is 4.9 Å. A removal material 2 is a potassium exchange synthetic zeolite in which the mole ratio of silica/alumina is smaller than 5 and the pore size is 3 Å. A removal material 3 is a sodium exchange synthetic zeolite in which the mole ratio of silica/alumina is smaller than 5 and the pore size is 9 Å. A removal material 4 is a lithium exchange synthetic zeolite in which the mole ratio of silica/alumina is smaller than 5 and the pore size is 9 Å. The marks "G" in Table 1 indicate that a sufficient performance can be exhibited when being used in the gas insulation breaker illustrated in FIG. 1, and the marks "B" indicate that a sufficient performance cannot be exhibited. In addition, in FIGS. 2 to 5, removal performances of the removal materials 1 to 4 are shown in graphs. In FIGS. 2 to 5, the horizontal axis indicates the time, and the vertical axis indicates the concentrations of HF, CO, and $O_3$ illustrated in FIG. 1, that is, the generated concentration (volume ppm) per 1 MJ of a breaking current energy in the gas insulation breaker. As shown in Table 1 and FIGS. 2 to 5, it is ascertained that the removal material 1 can exhibit a sufficient effect of reducing the concentration with respect to all of HF, CO, and $O_3$.

TABLE 1

|  | HF | CO | $O_3$ |
| --- | --- | --- | --- |
| Removal material 1 | G | G | G |
| Removal material 2 | B | B | B |

TABLE 1-continued

|  | HF | CO | $O_3$ |
| --- | --- | --- | --- |
| Removal material 3 | G | B | G |
| Removal material 4 | G | B | G |

The gas insulation apparatus of the present embodiment includes a gas insulation opening/closing apparatus. A gas insulation opening/closing apparatus includes a breaker, a disconnector, a grounding switch, and a lightning arrestor.

According to at least one embodiment described above, when a removal material is used, a gas insulation apparatus reducing the concentrations of HF, CO, and $O_3$ in the insulation gas can be provided. Accordingly, a life span and reliability of a gas insulation apparatus using an insulation gas having $CO_2$ and $O_2$ as main components can be secured in long-term use, and safety during maintenance can also be secured.

Some embodiments of the present invention have been described, but these embodiments are presented as examples and are not intended to limit the scope of the invention. These embodiments can be performed in various other forms, and various omissions, replacements, and changes can be performed within a range not departing from the gist of the invention. These embodiments and modifications thereof are included in the invention described in the claims and the scope equivalent thereto as they are included in the scope and the gist of the invention.

REFERENCE SIGNS LIST

1 Sealed container
2 Insulation gas
6 Removal material
31 Fixed contact portion (high-voltage portion)
41 Movable contact portion (high-voltage portion)

The invention claimed is:

1. A gas insulation apparatus comprising:
a sealed container;
an insulation gas that has $CO_2$ and $O_2$ filling the sealed container as main components;
a high-voltage portion that is stored in the sealed container; and
a removal material that reduces concentrations of HF, CO, and $O_3$ in the insulation gas,
wherein:
the removal material is a synthetic zeolite in which a mole ratio of silica/alumina is 5 or higher,
the sealed container includes an exhaust cylinder through which the insulation gas is able to flow after being sprayed to arc discharge generated inside the sealed container, and
the removal material is disposed at an end of the exhaust cylinder and disposed coaxially with the exhaust cylinder.

2. A gas insulation apparatus comprising:
a sealed container;
an insulation gas that has $CO_2$ and $O_2$ filling the sealed container as main components;
a high-voltage portion that is stored in the sealed container; and
a removal material that reduces concentrations of HF, CO, and $O_3$ in the insulation gas,
wherein:
the removal material is a synthetic zeolite having protons (H) as positive ions, the sealed container includes an exhaust cylinder through which the insulation gas is able to flow after being sprayed to arc discharge generated inside the sealed container, and the removal material is disposed at an end of the exhaust cylinder and disposed coaxially with the exhaust cylinder.

3. The gas insulation apparatus according claim 1,
wherein the removal material is constituted of a combination of two or more kinds of materials of a synthetic zeolite in which a mole ratio of silica/alumina is 5 or higher, a synthetic zeolite having protons (H) as positive ions, and a metal oxide.

4. The gas insulation apparatus according to claim 1,
wherein the insulation gas includes a gas component having a larger molecular size than $CO_2$.

5. The gas insulation apparatus according to claim 1,
wherein the gas insulation apparatus is an opening/closing apparatus, and
wherein the high-voltage portion includes:
a fixed contactor,
a movable contactor which is able to come into contact with or separate from the fixed contactor, is disposed so as to coaxially face the fixed contactor, and is constituted such that the arc discharge is able to be generated between the movable contactor and the fixed contactor at a time of separation, and
an insulation nozzle which is disposed such that the arc discharge is surrounded in order to spray the insulation gas to the arc discharge.

6. The gas insulation apparatus according to claim 5,
wherein the insulation nozzle includes a fluorine-based resin.

7. A gas insulation apparatus comprising:
a sealed container;
an insulation gas that has $CO_2$ and $O_2$ filling the sealed container as main components;
a high-voltage portion that is stored in the sealed container; and
a removal material that reduces concentrations of HF, CO, and $O_3$ in the insulation gas,
wherein:
the insulation gas includes a gas component having a larger molecular size than $CO_2$,
the sealed container includes an exhaust cylinder through which the insulation gas is able to flow after being sprayed to arc discharge generated inside the sealed container, and
the removal material is disposed at an end of the exhaust cylinder and disposed coaxially with the exhaust cylinder.

8. The gas insulation apparatus according to claim 1,
wherein the removal material has a combination of a synthetic zeolite in which a mole ratio of silica/alumina is 5 or higher and a metal oxide, or a combination of a synthetic zeolite having protons (H) as positive ions and a metal oxide.

* * * * *